United States Patent
Castaneda

(10) Patent No.: US 10,139,133 B2
(45) Date of Patent: Nov. 27, 2018

(54) IN-LINE HEATER

(71) Applicant: Heateflex Corporation, Arcadia, CA (US)

(72) Inventor: Hector Joel Castaneda, Cypress, CA (US)

(73) Assignee: Heateflex Corporation, Arcadia, CA (US)

(*) Notice: Subject to any disclaimer, the term of this patent is extended or adjusted under 35 U.S.C. 154(b) by 124 days.

(21) Appl. No.: 15/063,184

(22) Filed: Mar. 7, 2016

(65) Prior Publication Data
US 2017/0159970 A1 Jun. 8, 2017

Related U.S. Application Data

(63) Continuation-in-part of application No. 14/957,863, filed on Dec. 3, 2015, now Pat. No. 9,983,043.

(51) Int. Cl.
F24H 1/10 (2006.01)
F24H 9/12 (2006.01)
G01F 23/26 (2006.01)

(52) U.S. Cl.
CPC ............ F24H 9/128 (2013.01); F24H 1/102 (2013.01); G01F 23/26 (2013.01)

(58) Field of Classification Search
None
See application file for complete search history.

(56) References Cited

U.S. PATENT DOCUMENTS

| 896,204 | A | * | 8/1908 | Glauber | F16L 17/035 |
| | | | | | 277/622 |
| 1,936,552 | A | * | 11/1933 | Goss | F16L 19/0218 |
| | | | | | 285/341 |
| 2,438,529 | A | * | 3/1948 | Woodling | F16L 27/0816 |
| | | | | | 285/281 |
| 3,207,537 | A | * | 9/1965 | Kimbrell | F16L 19/028 |
| | | | | | 285/353 |
| 3,275,348 | A | * | 9/1966 | Scott | F16L 41/10 |
| | | | | | 277/606 |
| 3,489,437 | A | * | 1/1970 | Duret | E21B 17/042 |
| | | | | | 285/332.2 |
| 3,501,171 | A | * | 3/1970 | Baron | F16L 19/0206 |
| | | | | | 285/334.4 |
| 3,657,520 | A | | 4/1972 | Regault | |
| 3,856,337 | A | * | 12/1974 | Ehm | F16L 15/004 |
| | | | | | 285/334 |
| 4,158,764 | A | | 6/1979 | Yane | |
| 4,280,721 | A | * | 7/1981 | Narkon | F16L 41/007 |
| | | | | | 285/179 |
| 4,295,666 | A | * | 10/1981 | Melanson | F02C 7/222 |
| | | | | | 285/14 |
| 4,324,424 | A | * | 4/1982 | Woodliff | F16L 41/084 |
| | | | | | 174/656 |

(Continued)

Primary Examiner — Thor Campbell
(74) Attorney, Agent, or Firm — Kelly & Kelley, LLP

(57) ABSTRACT

An in-line heater having a heating vessel, defined at least in part by a wall, through which fluid to be heated flows. The wall of the vessel has at least one port formed therein. A fitting, having a body defining a pass-through passageway, is attachable to the port. An end of the body of the fitting has a groove or a ring which mates with a corresponding ring or groove of the port to form a liquid seal between the end of the fitting and the wall of the heating vessel.

16 Claims, 12 Drawing Sheets

(56) References Cited

U.S. PATENT DOCUMENTS

| | | | | |
|---|---|---|---|---|
| 4,550,937 A * | 11/1985 | Duret | ............ | E21B 17/042 285/114 |
| 4,593,713 A * | 6/1986 | Menshen | ............ | F16L 19/00 137/322 |
| 4,756,781 A | 7/1988 | Etheridge | | |
| 4,835,365 A | 5/1989 | Etheridge | | |
| 4,875,957 A | 10/1989 | Etheridge | | |
| 5,078,433 A * | 1/1992 | Morse | ............ | A61M 25/0014 285/281 |
| 5,251,942 A * | 10/1993 | Whaley | ............ | F16L 15/009 285/355 |
| 5,277,226 A * | 1/1994 | Kuhlman | ............ | E03C 1/023 137/801 |
| 5,295,851 A * | 3/1994 | Bawa | ............ | F16L 5/12 439/271 |
| 5,433,489 A * | 7/1995 | Kimura | ............ | F16L 15/008 285/220 |
| 5,441,314 A * | 8/1995 | Giovanni | ............ | F16L 41/10 277/641 |
| 5,648,639 A * | 7/1997 | Hand | ............ | H01R 4/60 174/51 |
| 5,865,473 A * | 2/1999 | Semchuck | ............ | F16L 25/023 137/606 |
| 6,712,401 B2 * | 3/2004 | Coulon | ............ | E21B 17/042 285/331 |
| 7,032,934 B2 * | 4/2006 | Wosik | ............ | F16L 19/055 285/332.2 |
| 7,121,594 B2 * | 10/2006 | Molter | ............ | E03D 1/32 285/354 |
| 7,225,523 B2 * | 6/2007 | Metcalfe | ............ | B21D 39/04 166/207 |
| 7,434,850 B2 * | 10/2008 | Duininck | ............ | F16L 25/0045 285/374 |
| 7,588,253 B2 * | 9/2009 | Bottura | ............ | F16L 41/10 277/609 |
| 7,758,086 B2 * | 7/2010 | Slunick | ............ | F16L 13/00 285/286.2 |
| 7,837,235 B2 * | 11/2010 | Geser | ............ | B05B 1/00 285/249 |
| 7,845,901 B2 * | 12/2010 | Aubin | ............ | F01D 17/105 285/226 |
| 7,980,601 B2 * | 7/2011 | Oh | ............ | F16L 25/0036 285/354 |
| 8,303,001 B2 * | 11/2012 | Oh | ............ | F16L 25/0036 285/340 |
| 8,534,467 B2 * | 9/2013 | Haas | ............ | B01D 29/96 210/459 |
| 9,027,967 B2 * | 5/2015 | Geser | ............ | B05B 1/00 285/249 |
| 9,127,790 B2 * | 9/2015 | Oh | ............ | F16L 25/0036 |
| 9,664,162 B2 * | 5/2017 | Kondo | ............ | F02M 61/14 |
| 9,885,439 B2 * | 2/2018 | Joh | ............ | F16L 41/10 |

\* cited by examiner

IN-LINE HEATER

RELATED APPLICATIONS

This application is a continuation-in-part of U.S. application Ser. No. 14/957,863, filed on Dec. 3, 2015.

BACKGROUND OF THE INVENTION

The present invention generally relates to in-line fluid heaters. More particularly, the present invention relates to an in-line fluid heater having an anti-corrosive fluid seal between a pass-through fitting and a heating vessel of the heater.

In-line fluid heaters containing an encapsulated electric immersion heater are used where maintaining the liquid's high purity is critical to the process. Such devices are used in industrial manufacturing processes, such as the manufacturing of semiconductors, solar cells, medical devices, or for such processes such as high quality electroplating, or other uses where it is necessary to heat ultra-pure, strongly acidic or caustic solutions at elevated temperatures.

Existing heaters for these applications maintain the fluid's high purity by encapsulating the metal heating wire with an inert plastic, such as perfluoroalkoxy (PFA) or polytetrafluorethylene (PTFE), in order to avoid metallic ions and other contaminants from leaching into the fluid. In addition, the encapsulation also protects the metal heating wire from damage in applications where strongly acidic or caustic solutions are used. The heating elements are then enclosed in a container or heater vessel. The wetted parts, including the container and the heating element encapsulation are made of materials compatible with the processed fluids since they will be in direct contact with the process fluid.

To permit passage of electrical heater lead wires and other wires, such as a ground wire, other tubes, etc. into the heating vessel, standard practice is to drill a hole into the wall of the heating vessel and tap it so that the resulting port has a Female National Pipe Thread (FNPT) configuration. A fitting with a Male National Pipe Thread (MNPT) is now suitable for attachment with the goal of avoiding fluid leakage through the connector fitting. An example of such a prior art heater vessel is described in U.S. Pat. No. 4,835,365 to Etheridge.

Unfortunately, the threads on the pass-through fitting become wetted surfaces. Threads can entrap particles and cause contamination to the process fluids. Other prior art configurations include an O-ring on the fitting to isolate the fitting threads. While this does eliminate the threads as a wetted part, it introduces another wetted material in the form of the O-ring, which can be damaged over time and shed particles into the process fluid.

Maintaining the process fluid free from contamination and particulates is critical to many manufacturing environments. For example, in semiconductor manufacturing, the industry continues looking for methods to reduce the feature sizes on a semiconductor device, and maintaining the process fluid free from contamination and particulates is critical.

Certain liquid pass-through devices, such as in-line fluid heaters and pumps, will be damaged if powered on without fluids. For example, the heating element in an in-line heater designed for heating liquids will typically burn out if operated in a dry condition as the heating element will not be able to dissipate the heat generated without the presence of liquid, thereby damaging the heating element. In a pump, operating in a dry condition can damage the internal mechanical parts by excessive friction or heat.

Therefore, it is common practice to install a liquid level sensor on the output side of such devices and interlock the sensor to the device's power in a manner in which the device can only be powered on when liquid is present. The liquid sensor is placed on the output side of the device to provide a means to electronically indicate when the liquid has flowed through the device, and therefore is safe to operate and power on. One liquid level sensor type commonly used for this application is a capacitive liquid level sensor. These sensors are desirable as they function outside the fluid path and therefore do not come in direct wetted contact with the process fluid, which is particularly desirable when the purity of the process fluid is important.

As the sensor reacts to the presence of liquid present in the tubing, a bracket is required to hold the sensor in place for proper operation. An unreliable sensor reading can result from improperly installing the sensor too close to the tubing or by changing the distance between the sensor and the tubing after calibration. Unreliable sensor readings can also result if the tubing sags, resulting in a change of distance between the tubing and the sensor. Moving the sensor farther upstream from the device could also result in faulty readings since a user can mistakenly place the sensor in a portion of the liquid path (tubing) that contains liquid in all conditions even though the liquid pass-through device does not contain liquid. This can happen, for example, in a section of piping similar to a P-trap or the like.

Therefore, there is a continuing need for an improved non-contaminating in-line heater for process fluids in such industries. There is also a continuing need for an apparatus that will hold a liquid level sensor in such a manner so as to keep the distance between the sensor and the tubing fixed and not allow a user to move the sensor to a different location of the tubing. The present invention fulfills these needs, and provides other related advantages.

SUMMARY OF THE INVENTION

The present invention resides in an in-line fluid heater which maintains the heated fluid's high purity by creating a fluid seal between the wall of the vessel and the attachment point of the pass-through fitting through which the heating element and other wires, tubes and fluid input or output passes through.

In accordance with the present invention, an in-line heater generally comprises a heating vessel, defined at least in part by a wall, through which fluid to be heated flows. A port is formed in the wall of the vessel. A fitting is attached to the port and has a body defining a pass-through passageway. An end of the body of the fitting has a groove or a ring which mates with a corresponding ring or groove of the port to form a liquid seal between the end of the fitting and the wall of the vessel.

The port may comprise a first aperture extending through the wall and a groove formed in the wall in spaced relation and concentric to the first aperture. The port may further comprise a second aperture having a greater diameter than the first aperture and extending from an exterior surface of the wall to the groove. An inner surface of the second aperture is threaded, and an outer surface of at least a portion of the fitting body is threadedly attachable to the internal threads of the port. A ring extends from the end of the fitting body that substantially mates with the groove.

The fitting includes a nut attachable to a second end of the fitting body for securing a tube to the fitting. The nut and the second end of the fitting body may be threadedly connected to one another. An outer surface of the second end of the fitting body and an inner surface of the nut may be configured to cooperatively engage the tube therebetween. Alternatively, the nut may include a compression connector that compresses against the tube as the nut is attached to the second end of the fitting body.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings, for purposes of illustration, the present invention resides in an in-line heater having a unique coupling between the pass-through fittings and ports of the heater providing access to a heating vessel which create a liquid tight seal and isolates the fluid from the threads, or other connectors of the fitting, thereby eliminating all O-rings and threads from wetted surfaces.

Figure 1:
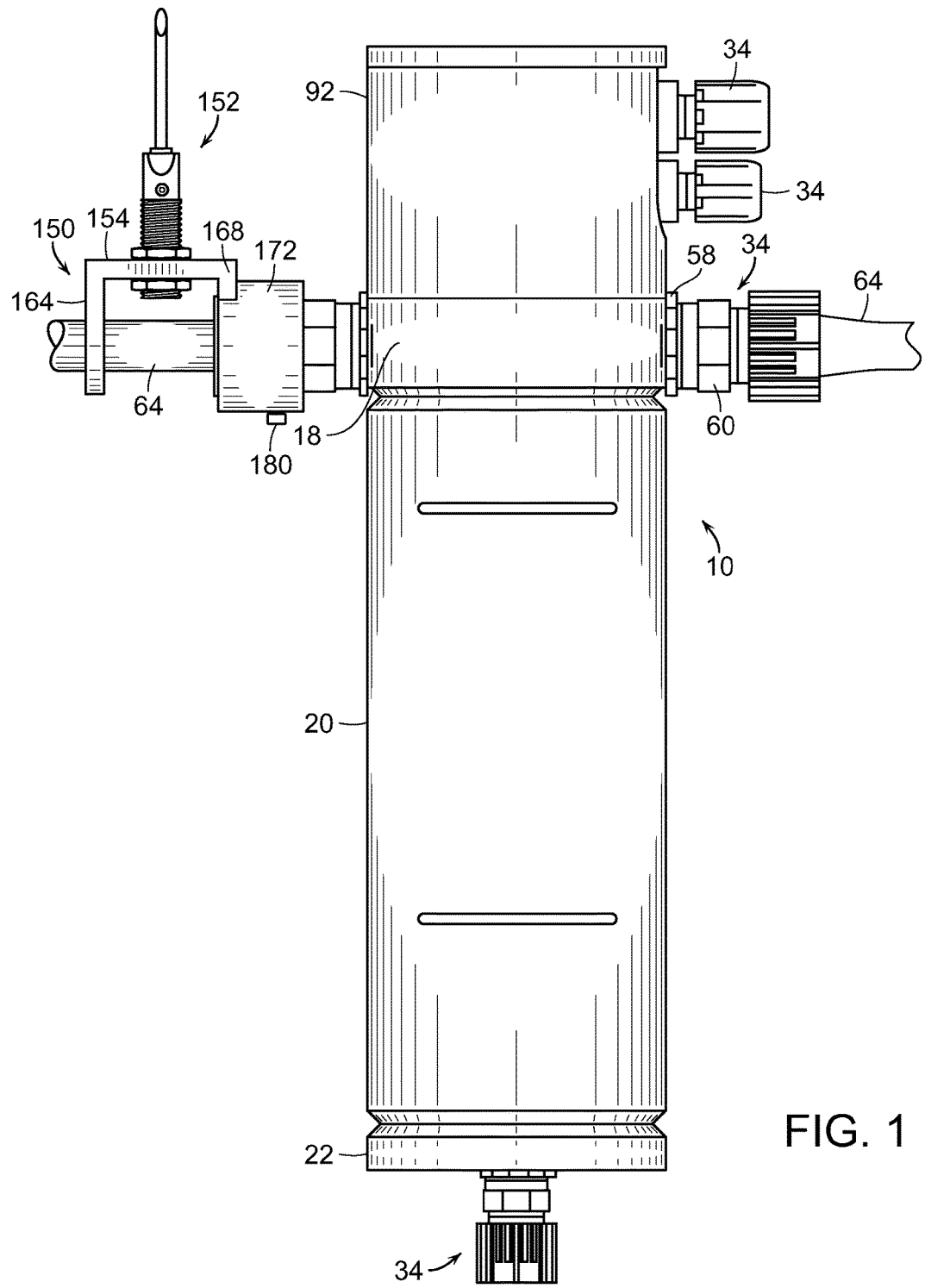
FIG. 1 is a side elevational view of an in-line fluid heater embodying the present invention.
Figure 2:
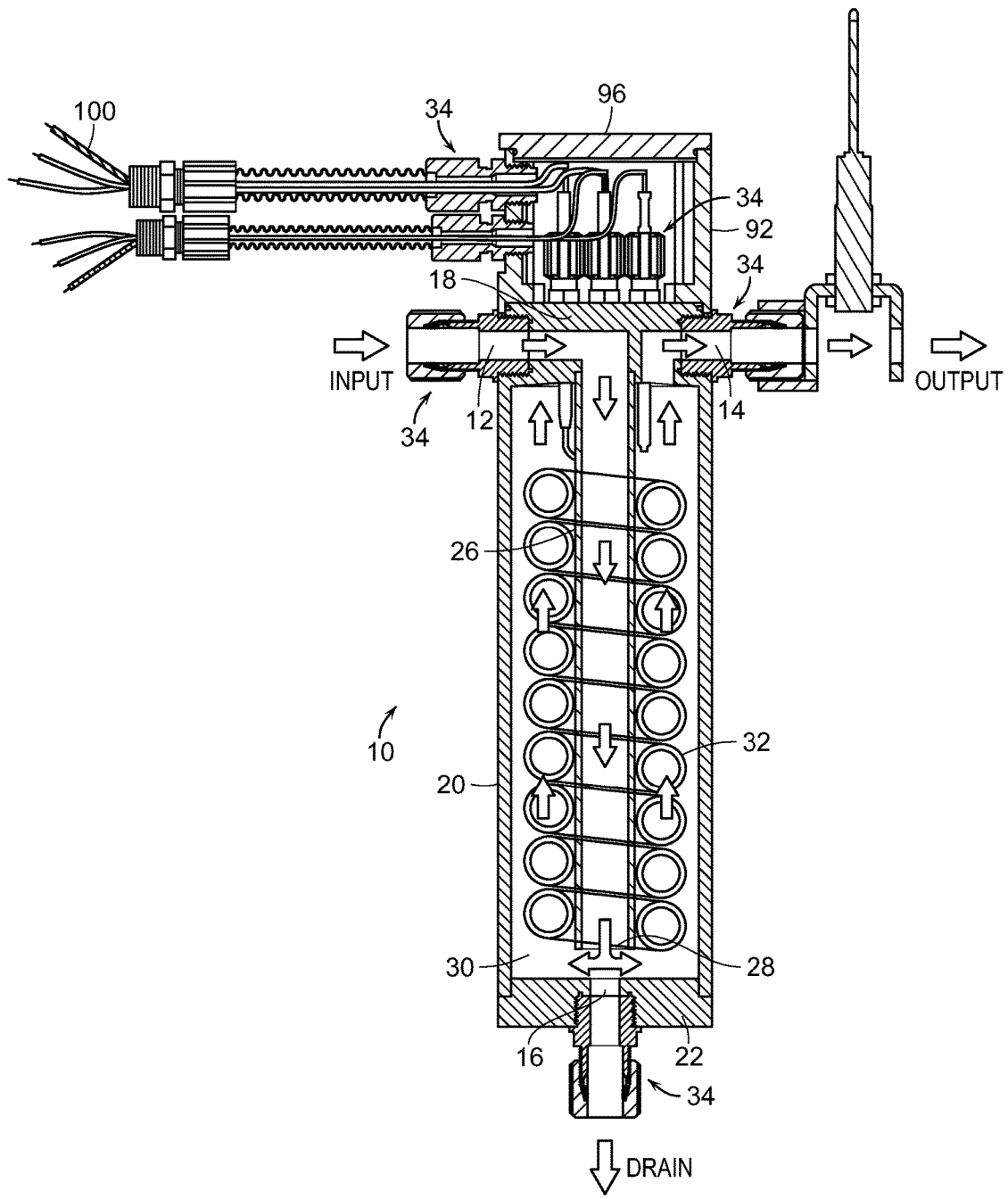
FIG. 2 is a cross-sectional view of the heater of the present invention, illustrating a fluid flow path therethrough.
Figure 3:
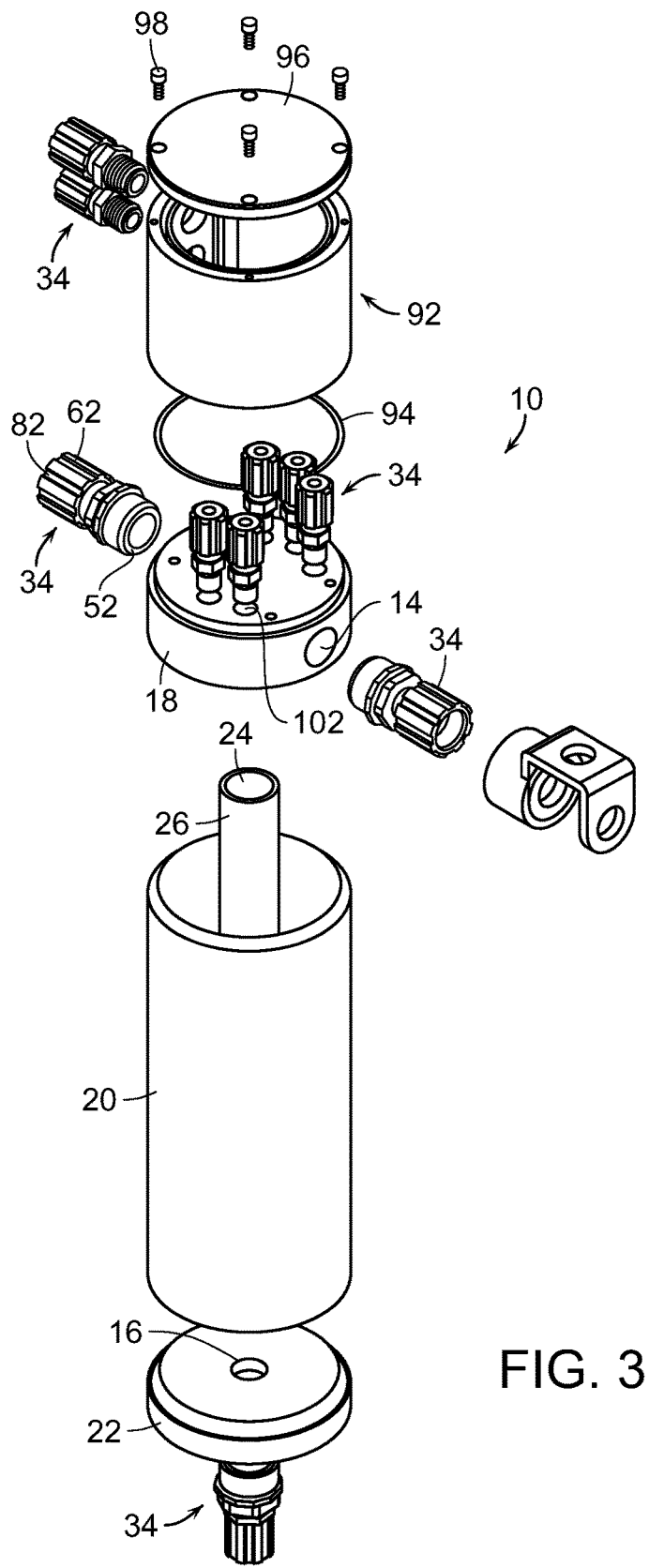
FIG. 3 is an exploded perspective view of an in-line heater embodying the present invention.

With reference now to FIGS. 1-3, FIG. 1 is a side elevational view of an in-line heater 10 embodying the present invention. As illustrated in FIG. 2, the in-line heater has a fluid inlet 12 which passes the fluid through a heating vessel of the heater 10, and then through an outlet 14. The heater 10 may also include a drain 16 for draining the fluid when deemed necessary. The heater is particularly designed for and useful in situations where maintaining the fluid's high purity is critical to the process for which the fluid is used. Such industrial manufacturing processes, such as the manufacturing of semiconductors, solar cells, medical devices, electroplating and the like are examples of such processes where the in-line heater 10 of the present invention is useful as it maintains the fluid's high purity.

With continuing reference to FIGS. 1-3, the in-line heater 10 of the present invention includes a heating vessel, defined at least in part by a wall, through which fluid to be heated flows. In the illustrated embodiment, the heating vessel is comprised of interconnected components, namely, a top cap 18 which is coupled to a vessel pipe or housing 20, and a bottom cap 22 which is coupled to the opposite end of the housing 20. In the illustrated embodiment, the fluid inlet 12 and outlet 14, as well as other access ports, are formed in the top cap 18, while the drain aperture 16 is formed in the bottom cap 22.

As shown by the directional arrows in FIG. 2, fluid is input into the in-line heater 10 through inlet 12, which then directs the fluid into inlet 24 of pipe 26, where it flows until exiting outlet 28 and into the chamber 30 formed between the pipe 26 and the outer pipe or housing 20, where it contacts heating element 32, which may be coiled around the inner pipe 26, as illustrated in FIG. 2 so as to provide a large contact area between the heating element 32 and the fluid flowing through chamber 30 and into contact and around the heating element 32.

Figure 4:
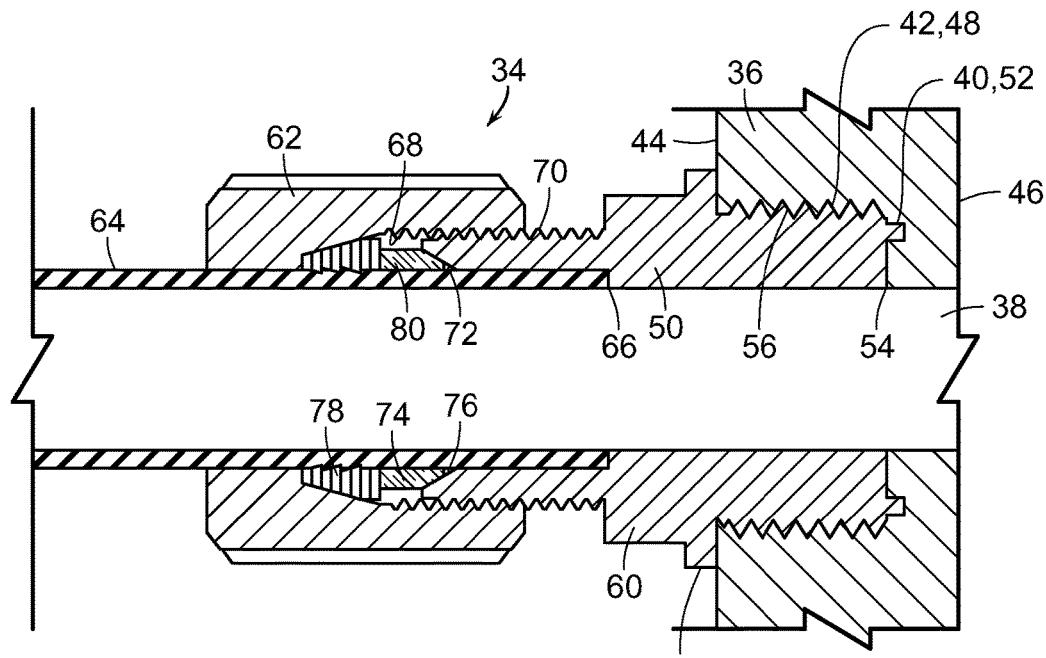
FIG. 4 is a cross-sectional view of a fitting attached to a port and a tube fastened to the fitting, in accordance with the present invention.
Figure 5:
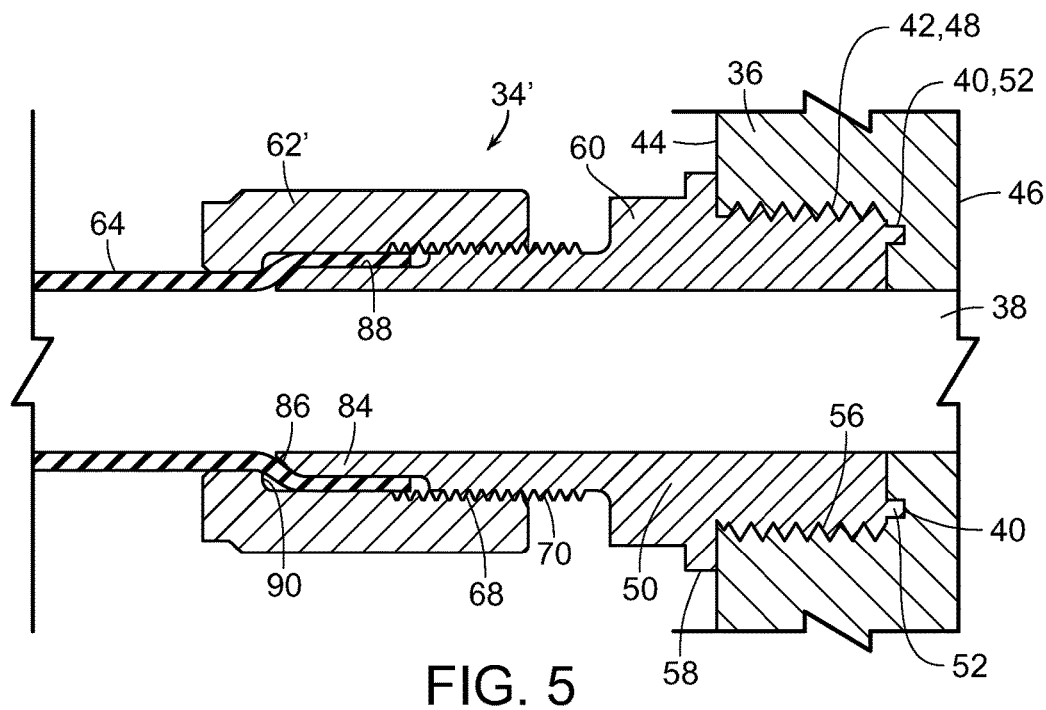
FIG. 5 is a cross-sectional view of another fitting embodying the present invention attached to a port of the in-line heater and having a tube coupled to the fitting, in accordance with the present invention.

It can be seen, as shown in FIG. 2, that pass-through fittings 34 are coupled to the inlet 12, outlet 14, and drain 16 ports of the heating vessel. With reference now to FIGS. 4 and 5, cross-sectional views of fittings 34 and 34' embodying the present invention are shown attached to a port formed in a wall 36 of the heating vessel. As FIGS. 4 and 5 illustrate pass-through fittings 34 and 34' which are coupled to either the inlet or outlet of the heating vessel, the wall 36 is a wall of the top cap 18, although it will be appreciated that the same principles of the invention can apply so long as a port is formed in a wall of the heating vessel.

The port or opening formed through the wall 36 in the illustrated embodiment comprises a first aperture 38 extending through the wall 36 so as to permit passage into the heating vessel. A groove 40 is formed in the wall 36 in spaced relation and concentric to the first aperture 38. In the illustrated embodiment, the port further comprises a second aperture 42 having a greater diameter than the first aperture 38 and extending from an outer surface 44 of the wall 36 to the groove 40. It will be appreciated that the first aperture 38 will generally be formed from the outer surface 44 through the inner surface 46 of the wall 36. The second, larger diameter, aperture 42 is then formed partially through the wall 36, as illustrated. The groove 40 can then be made concentrically around the first aperture 38. Typically, an inner surface of the wall 36 forming the second aperture 42 includes internal threads 48.

The fitting 34 comprises a body 50 which is generally hollow so as to have a passageway extending therethrough for passage of fluid, a tube, or the like. A ring 52 protrudes from a first end 54 of the body 50 which mates with the groove 40 of the port as the fitting 50 is secured to the port.

A portion of the body adjacent to the first end 54 includes external threads 56 which allow the body 50 to be threadedly connected to the internal threads 48 of the port, and thus wall 36 of the heating vessel. As the body 50 is increasingly threadedly connected and inserted into the port, ring 52 extends into and mates with groove 40, forming a tongue and groove fit or joint. The body may include a circumferential shoulder which forms a stop 58 which engages the outer surface 44 of the wall 36 to prevent over insertion of the body 50 into the port formed in the wall 36, such as ensuring that the ring 52 is sufficiently inserted into groove 40, but not over inserted so as to cause damage to the ring 52 extending from the end 54 of the body 50. In fact, it is preferred that the ring or tongue 52 project slightly less than the entire depth of the groove 40 in order to adequately create the fluid tight seal therebetween while not deforming or otherwise damaging the ring 52.

A portion of the body 60 intermediate the ends thereof may have a multi-faceted exterior surface, such as a hex configuration to permit a wrench, socket or other tool to fasten the body 50 to the port of the wall 36 of the heating vessel. When the body 50 is fully inserted into the port and attached to the wall 36, as illustrated in FIGS. 4 and 5, the ring or tongue 52 extends into and mates with the groove 40, while there is a threaded connection between the external threads 56 of the first end of the body 50 and the internal threads 48 of the second aperture 42 of the port. The ledge or stop 58 may ensure that a proper connection is made between the fitting body 50 and the port of the wall 36. With the fitting body 50 attached to the port formed in the wall 36, a fluid seal is created between the ring or other projection 52 and the groove 40 of the port, creating a liquid-tight seal and preventing fluid from reaching the threads 48 and 56, and thus maintaining purity of the processed fluid and overcoming the disadvantages of the prior art, as mentioned above. This arrangement also precludes the need for an O-ring or the like.

Although embodiments are illustrated and described herein as having the ring or tongue 52 extending from the end 54 of the fitting body 50, it will also be understood by those skilled in the art that instead the end 54 of the fitting body 50 could have a groove formed therein into which a projection in the form of a ring or the like created during the manufacture of the port would extend into as the fitting body 50 was connected to the port, and achieve the same ring and groove mating connection, in the form of a tongue and groove connection, creating a fluid-tight seal therebetween.

The fitting 34 also includes a nut 62 removably attachable to a second or exposed end of the fitting body 50 for securing a tube 64 or the like to the fitting 34. The tube 64 may comprise a fluid tube, such as would be used to convey fluid either to the inlet 12 or from the outlet 14 of the heater 10. In such case, the tube 64 is interconnected and attached to the end of the fitting 34 by virtue of the coupling and attachment of the nut 62 to the fitting body 50. However, in other instances, the tube may be a pass-through tube which extends through the passageway 52 of the fitting body 50 and secured in place due to the connection of the nut 62 and the fitting body 50. The tube 64 when used to transmit fluid to or from the in-line heater may be comprised of any suitable material, but is typically comprised of a fluoropolymer, such as perfluoroalkoxy (PFA), for high purity industrial processes, although the tubing 64 could be comprised of corrosive-resistant metal, or other plastic and materials depending on the application.

With reference to FIG. 4, in this embodiment of the fitting 34, the tube is inserted until it reaches an internal stop ledge 66 of the fitting body 50. Nut 62 is attached to the second end of the fitting body 50 so as to fasten tube 64 to the fitting 34. In the embodiment in FIG. 4, this is done by threadedly attaching the internal threads 68 of the nut to the external threads 70 of the fitting body 50. An internal bevel 72 at the second end of the body fitting receives a ferrule 74 therein. An external bevel 76 of the ferrule engages and is received within the internal bevel 72 of the end of the fitting body 50. As the nut 62 is increasingly attached to and tightened onto the end of the fitting body 50, the sloped or beveled portion 76 of the ferrule is increasingly pushed inwardly until it comes into contact with the outer surface of tube 64, which forms a liquid seal. As the nut 62 is tightened onto the fitting body, a gripper, such as a compression ring 78, is pushed by end 80 of the ferrule 74, causing it to increasingly come into contact with and grip the tube 64, so as to hold the tube in place. Typically, an exterior surface of the nut 62 has a configuration which enables manual gripping and attachment of the nut 62 so as to be fastened onto the threaded end of the fitting body 50. For example, the exterior surface of the nut 62 may include a plurality of spaced-apart grooves 82 which forms a gripping surface sufficient to manually grip and tighten the nut 62 onto the fitting body 50, as described above.

With reference now to FIG. 5, it is contemplated by the invention that there are other manners of securing and coupling the tube 64 to the fitting 34, and particularly to the fitting body 50 and nut 62, by virtue of the interconnection of the nut 62 and fitting body 50. As illustrated in FIG. 5, for example, internal threads 68 of the nut 62' may engage the external thread 70 of the second or exterior portion of the fitting body 50. However, in this embodiment, the second end 84 of the fitting body is of a reduced cross-sectional thickness or diameter, or an internal surface of the nut 62' would have a recess formed therein, such that the tube 64 would extend between the internal surface of the nut 62' and the exterior surface of the fitting body 50. This is typically done by reducing the cross-sectional thickness of the second end 84 of the fitting body 50, such that an end of the tube 64 can extend thereover. The far end 86 of the fitting body 50 may have an outer slope or bevel which facilitates the insertion of the tube 64 over the end 84 of the fitting body 50. As the nut 62' is threadedly attached onto the fitting body 50, an end portion 88 of the tube is sandwiched between the outer surface of the end 84 of the fitting body 50 and an internal surface of the nut 62', until an internal ledge or stop 90 of the nut 62' comes into contact with the tube 64 and compresses the tube 64 between the far end 86 of the fitting body 50 and the ledge or stop 90 formed on the inner surface of the nut 62'. Increasingly threadedly attaching the nut 62' to the fitting body 50 serves to compress and pinch the tube 64 between portions 86 of the fitting body 50 and 90 of the nut 62' until the nut 62' cannot be attached any further to the fitting body 50 and the tube 64 is secured therebetween. A fluid-tight seal is then created at the point where the tube 64 is compressed between the nut 62 and the fitting body 50.

In the arrangements illustrated in FIGS. 4 and 5, the tube 64 is typically either an inlet tube or an outlet tube 64 which conveys the fluid either into or from the in-line heater 10. Such a tube 64 could also be used in connection with the drain 16 and the fitting 34 coupled to the port thereof. In such cases, the tube 64 typically does not extend into the heating vessel, but rather only to its connection with the fitting 34 at the port of the inlet, outlet or drain.

In other instances, however, a tube must extend substantially or entirely through the fitting 34 so as to enable a component to extend into the heating vessel, as illustrated in FIGS. 6-10. In such case, typically, the stop or shoulder 66 formed in the fitting illustrated in FIG. 4 would not be present in these fittings so that the tube housing the component or through which the component extends can be inserted substantially, or even entirely, through the fitting so as to enter the heating vessel.

With reference now to FIGS. 2 and 3, an electrical junction box 92 is attached to the top cap 18, through which the wires and leads, etc. for the heating element, sensors, etc. extend. An O-ring 94 may be disposed between the junction box 92 and the top cap 18 to provide a fluid-tight seal therebetween in the event that there is any leaking from the heating vessel. A top plate or cover 96 may be removably attached to the junction box 92, such as by the illustrated bolts or screws 98 which can provide access to the wires, fittings, and the like within the junction box 92.

As illustrated in FIG. 2, wires, electrical leads and the like 100 extend through the electrical junction box, and through fittings 34 which extend through heating vessel ports or openings, as described above, such as through a top plate or wall of the top cap 18. Fittings 34 embodying the present invention and ports also formed in accordance with the present invention may be formed in the side wall of the junction box to create a fluid-tight seal. However, as it is not anticipated that any fluid will enter into the junction box 92, other fittings may be used through which the wires 100 extend into the junction box 92. The wires 100 may comprise heater lead power wires, hi-limit wires, thermal fuse and sensor lead wires and the like.

As shown in FIG. 3, in the illustrated in-line heater 10 embodying the present invention, there are five pass-through fittings 34, which are used for the thermal fuse, ground wire, process temperature sensor, heater lead and hi-limit temperature sensor, so that these lead wires and components can extend through the top cap 18 and into the heating vessel to perform their respective functions. The pass-through fittings 34 and the ports formed in the wall of the top cap 18 of the heating vessel are formed as discussed above so as to create a tongue and groove, liquid-tight seal by virtue of the ring inserted within a groove arrangement to obviate the need for an O-ring and prevent any O-ring and threads from becoming wetted and into contact with the process fluid, potentially creating contamination to the high purity process fluid.

Figure 6:
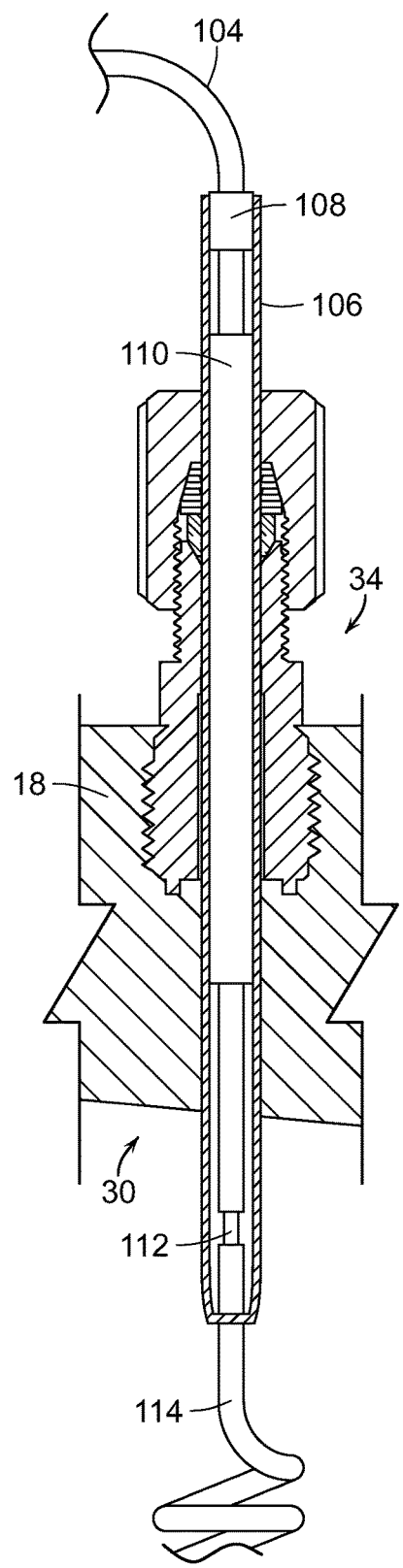
FIG. 6 is a cross-sectional view illustrating a heater lead wire extending through a tube and pass-through fitting, in accordance with the present invention.

With reference now to FIG. 6, a cross-sectional view of a heater lead wire extending through a fitting 34 of the present invention, as described above, and the top cap 18 and into the chamber 30 of the heating vessel is shown. A heater lead wire 104 extends into a tube 106 through a seal 108. The tube 106 is typically comprised of PFA, and may have a stainless steel tube 110 inserted therein to provide structure. The metallic wire 112 of the heater lead wire, with the protective coating removed, is connected, such as by soldering or the like, to the heating element 114. Typically the heating element is coated with PFA or another inert and protective layer. Moreover, typically the inner cavities of the tube 106 are filled and encapsulated with melted PFA, which hardens into one or more slugs within the tube 106, so as to prevent further possibility of leakage and contamination.

Figure 7:
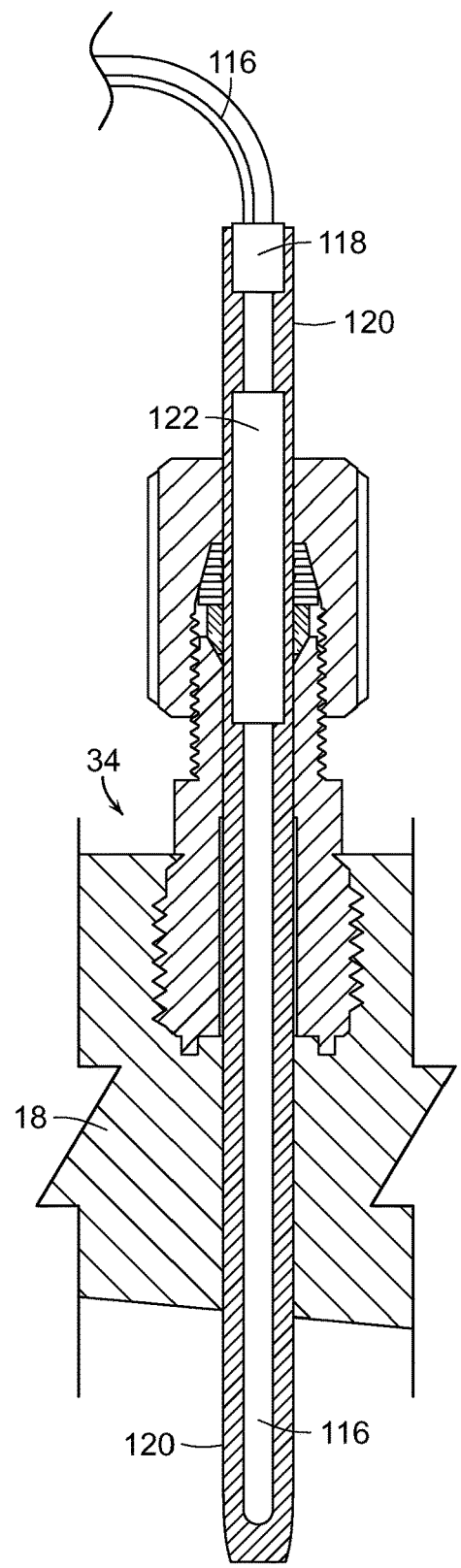
FIG. 7 is a cross-sectional view of a temperature sensor extending through the port and pass-through fitting, in accordance with the present invention.

With reference now to FIG. 7, a cross-sectional view of a process temperature sensor extending through the pass-through fitting 34 embodying the present invention and the top cap 18 is shown. One or more process temperature sensor wires 116 extend through seal 118 and into tube 120 which can be comprised of an inert material, such as PFA, Teflon™, or the like. An internal stainless steel tube 122 may be used to provide internal strength for the PFA tube 120, particularly as it passes through the fitting 34, which forms a compression fit attachment thereto, as described above. The temperature sensor is coupled to a circuit to control the electricity provided to the heating element 114, so as to control the temperature of the fluid being heated by the in-line heater 10.

Figure 8:
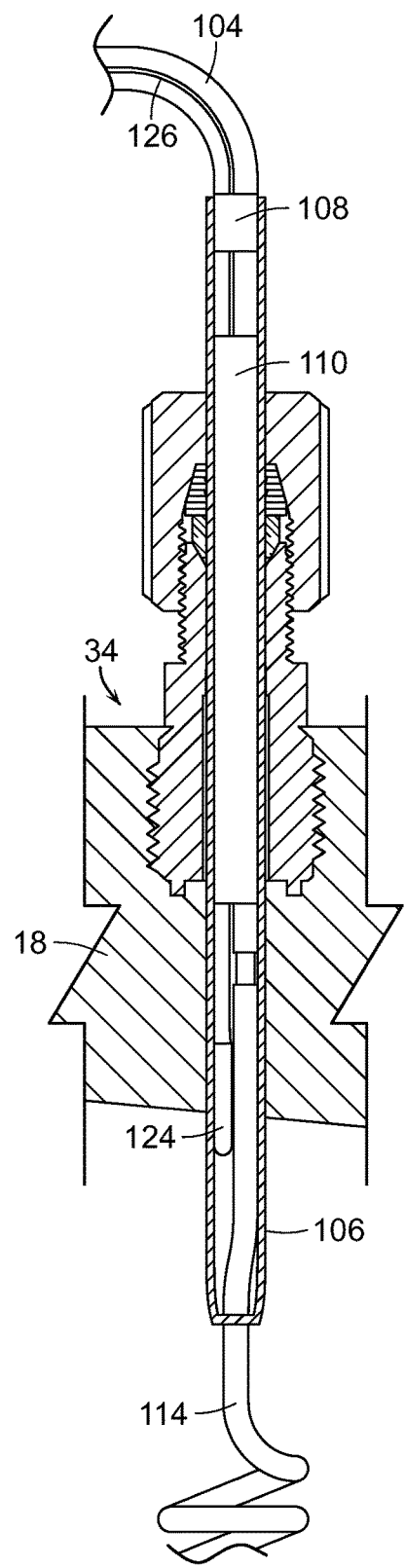
FIG. 8 is a cross-sectional view if a hi-limit and heater lead wire extending through a pass-through fitting and port, in accordance with the present invention.

With reference now to FIG. 8, as a backup safety measure, the other end of the heating element 114 has a hi-limit temperature sensor 124 encapsulated with the heating element 114 within the tube 106. A hi-limit temperature sensor wire 126 is coupled to the sensor 124, and if the heating element becomes too hot then the sensor is connected to another circuit which can shut down the heater or control the heating as necessary. If the heating element becomes too hot, the secondary circuit can detect this and shut down the heater 10 if necessary and if sensor 116 and its circuit have not detected the excess of heating situation or are otherwise not working properly.

Figure 9:
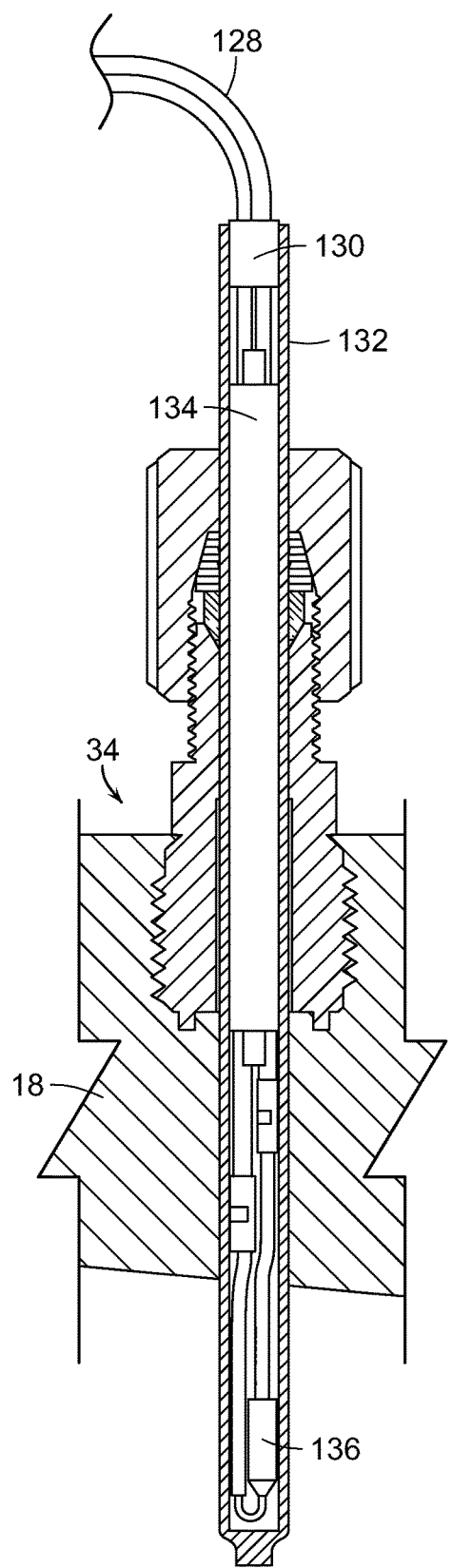
FIG. 9 is a cross-sectional view of a thermal fuse extending through the pass-through fitting and port, in accordance with the present invention.

With reference now to FIG. 9, a cross-sectional view of a thermal fuse used in accordance with the present invention is shown. One or more thermal fuse wires 128 extend through seal 130 and into tube 132. Once again, for structural support and rigidity, an internal stainless steel tube 134 or the like may be used. A thermal fuse 136 serves as yet another backup safety measure to prevent excessive heating of the fluid. If the heated fluid becomes excessively hot, the fuse is broken, which shuts off power to the heater 10.

Figure 10:
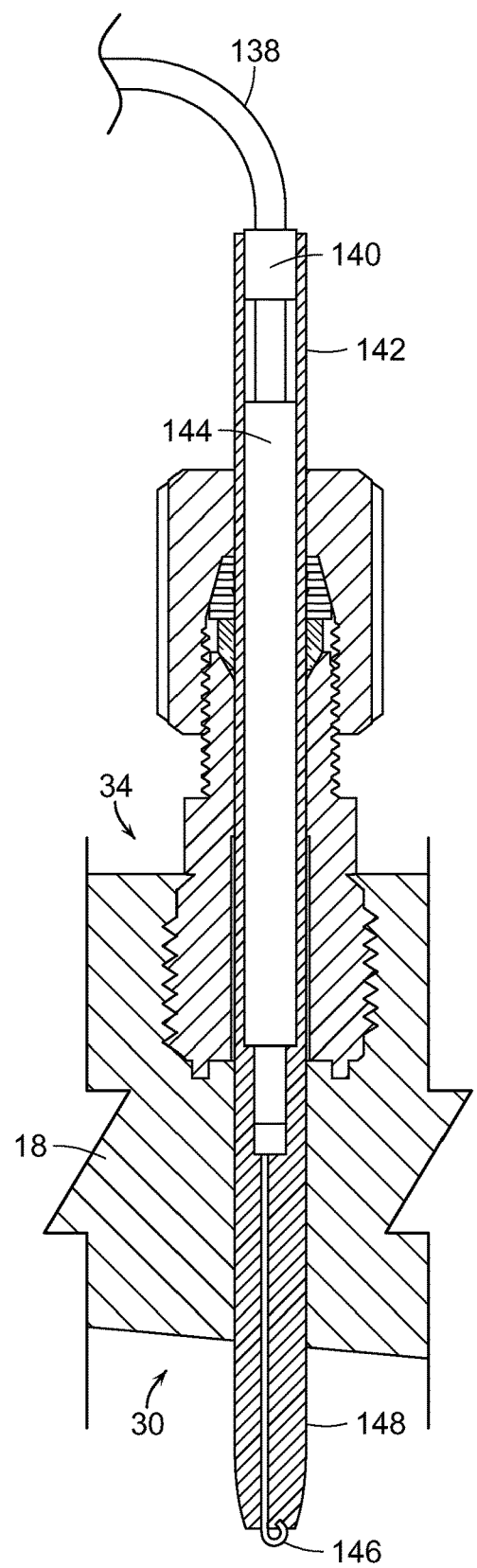
FIG. 10 is a cross-sectional view illustrating a ground wire extending through the pass-through fitting and port, in accordance with the present invention.

With reference now to FIG. 10, a cross-sectional view of a ground wire 138 is shown which is used in accordance with the present invention. The ground wire 138, having the protective PFA or other material extends through a seal 140 and into tube 142. Once again, a stainless steel or other structurally supportive tube 144 may be used through the fitting to provide structural support as the tube is secured to the fitting, as described above. An exposed wire tip 146 extends through the PFA encapsulated end of the tube 148 so as to be exposed to the fluid within the chamber 30. Preferably, the exposed wire 146 is comprised of platinum or other non-reactive and non-corrosive material. The exposed wire 146 acts as an electrical ground and a circuit breaker, in the event that the Teflon™ coating on the heating element within the vessel is damaged so that electricity flows from the exposed heating element wire.

With reference now to FIGS. 11-14, in another aspect of the present invention, an apparatus 150, such as a specialized bracket, is attachable to a liquid level sensor 152 and maintains the position of the liquid level sensor 152 relative to the in-line heater as well as the tube 64 which conveys fluid either into the inlet, or more typically from the outlet of the in-line heater to ensure that a proper level of fluid is continuously flowing through the in-line heater to protect the heating element and other components of the heater 10 which would become damaged in the event that a proper volume of fluid was not passing through the in-line heater during operation.

A number of different liquid level sensors 152 may be used in accordance with the present invention, but the present invention is particularly suited for use with capacitive liquid level sensors. Such sensors are desirable in applications where it is preferred that the sensor does not come into direct contact with the process fluid, such as due to process fluid purity concerns or the caustic nature of the process fluid. As capacitive liquid level sensors function outside the fluid path, and do not come into direct wetted contact with the process fluid, it is particularly useful in such applications.

The bracket apparatus 150 of the present invention is configured and designed to keep the liquid level sensor 152 at a fixed distance relative to the outlet tubing 64, so as not to allow the tubing 64 to sag relative to the sensor 152, and does not allow a user to move the sensor 152 to a different location on the liquid outlet tubing 64, and thus maintains a proper relationship between the liquid level sensor 152, in-line heater 10, and outlet tubing 64 so as to provide accurate and correct fluid flow readings.

As is known in the art, a capacitive liquid level sensor is installed a desired distance from the liquid tubing and calibrated so as to provide reliable sensor readings of the liquid passing through the tube. Accordingly, maintaining the relative position and distance and orientation to the tubing is important in order to keep reliable sensor readings. As will be more fully described herein, the present invention is designed and configured to properly position and maintain the liquid level sensor 152 relative to the liquid outlet tube 64, as well as the heater 10, by being coupled to the liquid pass-through device 34, to meet these desired requirements.

Figure 11:
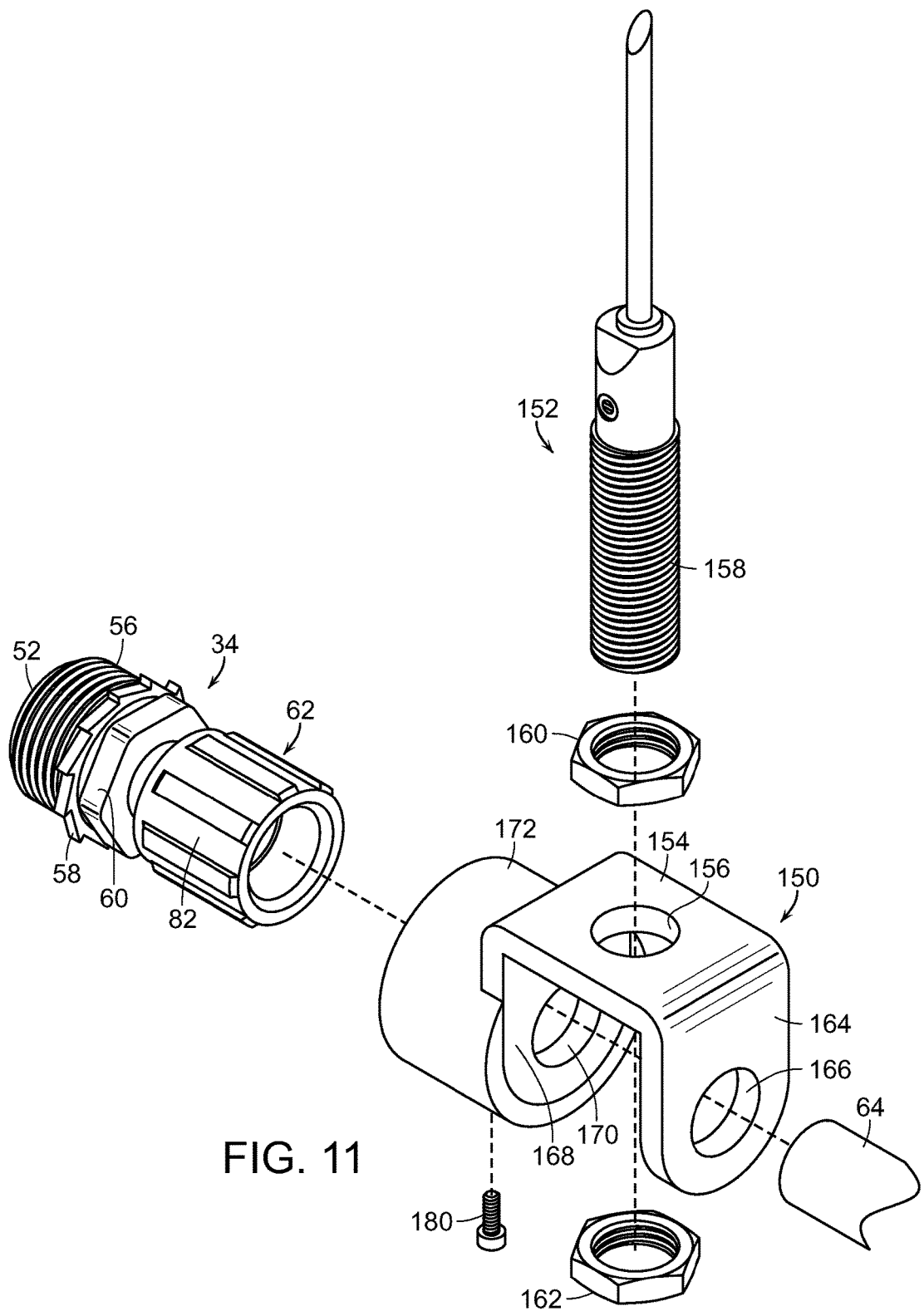
FIG. 11 is an exploded perspective view of a liquid level sensor and an apparatus for positioning the sensor relative to an outlet of the heater.

With continuing reference to FIG. 11, the apparatus 150 of the present invention is removably attached to the nut 62 of the liquid pass-through fitting 34. The liquid outlet tube 64 extends from the fitting 34 through the apparatus 150 and typically in spaced relation to the liquid level sensor 150.

It is important that liquid be present and passing through the in-line heater device 10 before the heater is powered and its heating elements heated in order to avoid damaging the heating elements and the heater device 10. In the heater device 10 illustrated in FIG. 1, a liquid inlet 12 supplies a source of liquid into heating vessel chamber 30, which then passes through the outlet 14. Lead wires and the like (as described above) may pass through fittings 34 so as to provide electrical power necessary to the heating element and sensors and the like within the heater device 10.

Figure 12:
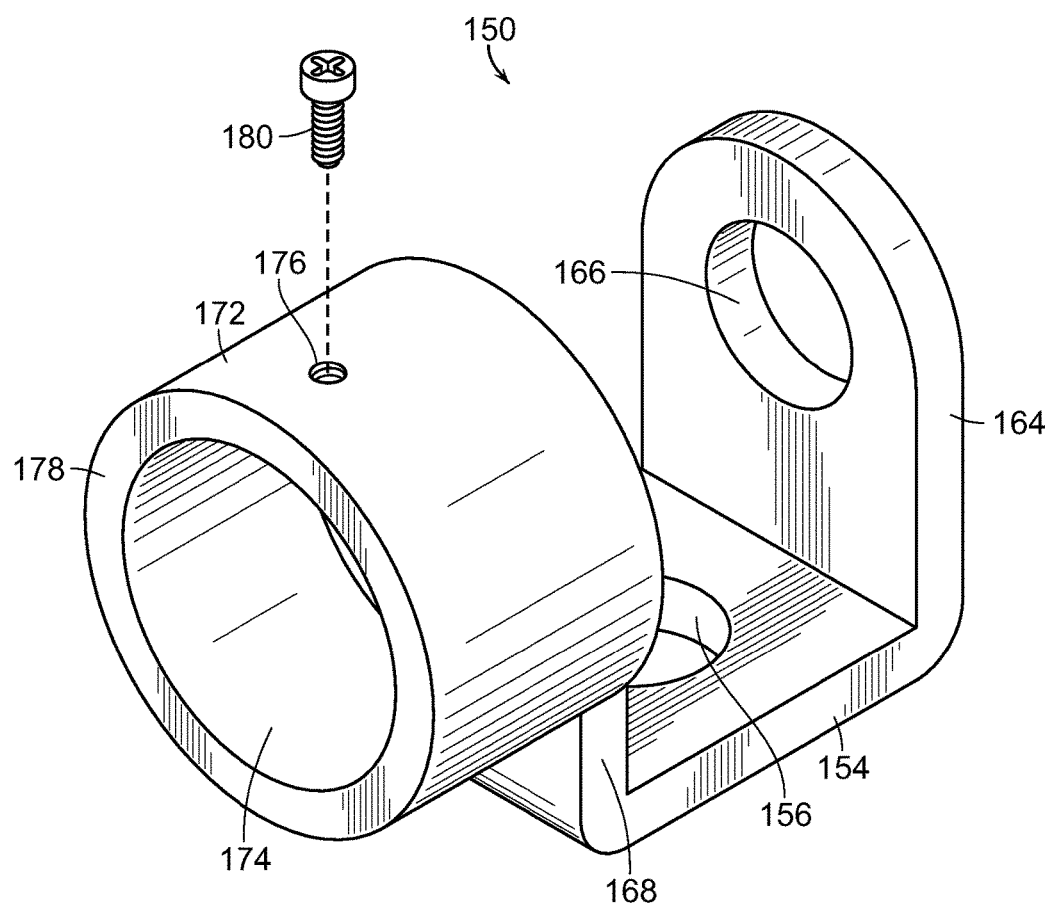
FIG. 12 is a side perspective view of the apparatus of FIG. 11.

With continuing reference to FIGS. 11 and 12, the apparatus 150 of the present invention comprises a liquid level sensor support 154, typically in the form of a generally horizontal platform, having an aperture 156 for receiving a portion of the liquid level sensor 152 therethrough. In the illustrated embodiment, a lower portion of the liquid level sensor 152 has threads 158. A first threaded nut 160 is threadedly attached to the liquid level sensor 152. The portion of the liquid level sensor 152 disposed below the first attached nut 160 extends through the aperture 156 of the sensor support 154 of the apparatus 150. A second threaded nut 162 is then threadedly attached to the portion of the liquid level sensor 152 extending below the liquid level sensor support platform 154 and tightened so as to hold the liquid level sensor 152 in place. It will be appreciated that the liquid level sensor 152 can be raised and lowered by the loosening and tightening of the nuts 160 and 162 so as to position the liquid level sensor 152 relative to the liquid tubing 64 and calibrate the liquid level sensor 152.

A first arm 164 extends from the support platform 154. The arm 164 includes an aperture 166 for receiving the liquid outlet tube 64 therethrough. A second arm 168 extends from the support platform 154 in spaced relation to the first arm 164. The second arm 168 includes an aperture 170 which is aligned with the aperture 166 of the first arm 164 and also sized and configured so as to receive the liquid outlet tube 64 therethrough. Typically, the arms 164 and 168 extend from the support platform 154 at similar angles, typically approximately a ninety degree angle, so as to extend generally perpendicular and downward with respect to the support platform 154. The arms 166 and 168 are spaced apart from one another a sufficient distance so that a length of the liquid outlet tubing 64 can extend therebetween and the liquid level sensor 152 obtain readings therefrom, but a sufficiently close distance that the liquid outlet tube 64 will not sag, which could undesirably alter the readings of the sensor 152.

In order to force an installer to attach the apparatus 150 of the present invention to the output connector or fitting 34, and not further upstream away from the heater 10, the apparatus 150 includes a socket 172 which is configured to be removably attachable to the outlet of the pass-through fitting 34. The socket 172 is typically generally cylindrical in configuration and hollow and having an interior diameter which is slightly greater than the outer diameter of the nut 62 of the pass-through fitting 34, so as to be slid thereover and attached thereto. The hollow nature of the socket 172 enables the liquid outlet tube 64 to extend from the liquid pass-through fitting 34, through the socket 172, and then through apertures 170 and 164 of the second and first arms 168 and 164, respectively.

The socket 172 extends from the second arm 168. The socket 172 may be attached to the second arm 168, such as by adhesive, welding or the like. It will also be appreciated that the socket 172 and second arm 168 could be formed as a single member. In fact, the present invention contemplates that the entire apparatus 150 could be formed as a unitary piece which can be molded, milled or the like to form the component parts or segments thereof. Alternatively, the components can be attached to one another.

With reference now to FIG. 12, the inner surface 174 of the socket 172 may be smooth, and define an inner diameter which is slightly greater than the outer diameter of the nut 62 so as to be slidingly, yet preferably frictionally, fit thereon. To ensure a connection, an aperture 176 is formed through the side wall 178 and a screw or bolt 180 inserted therein and into contact with the nut 62 so as to hold the apparatus 150 firmly in place with respect to the fitting 34.

Figure 13:
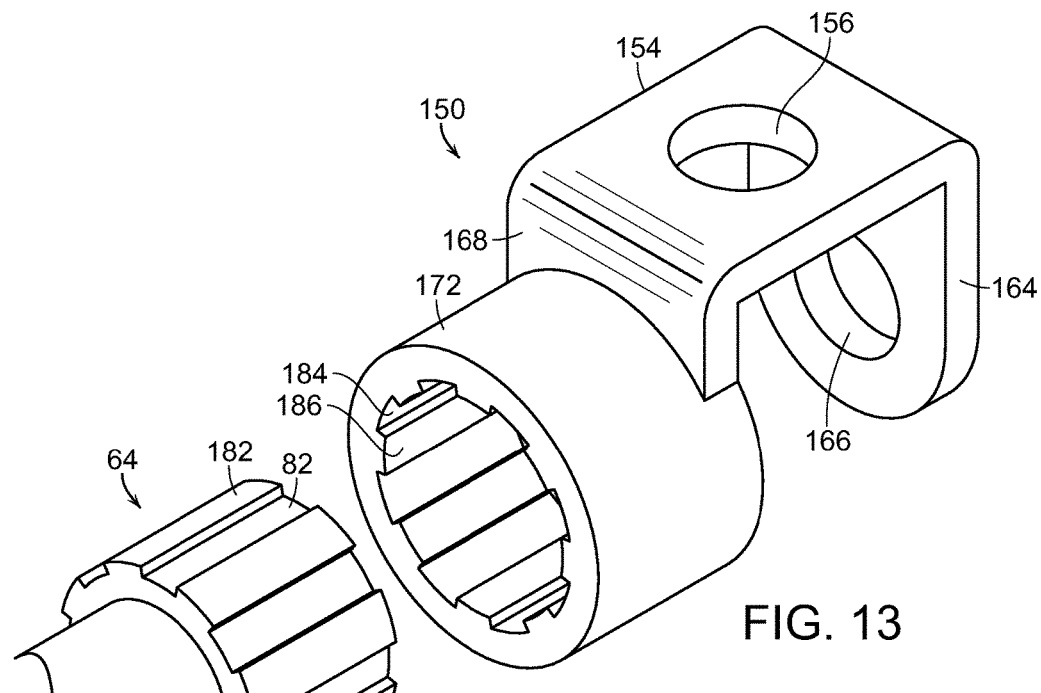
FIG. 13 is a perspective view illustrating an inner surface of a socket of the apparatus having a mirror configuration to the outlet of the liquid pass-through fitting, in accordance with the present invention.
Figure 14:
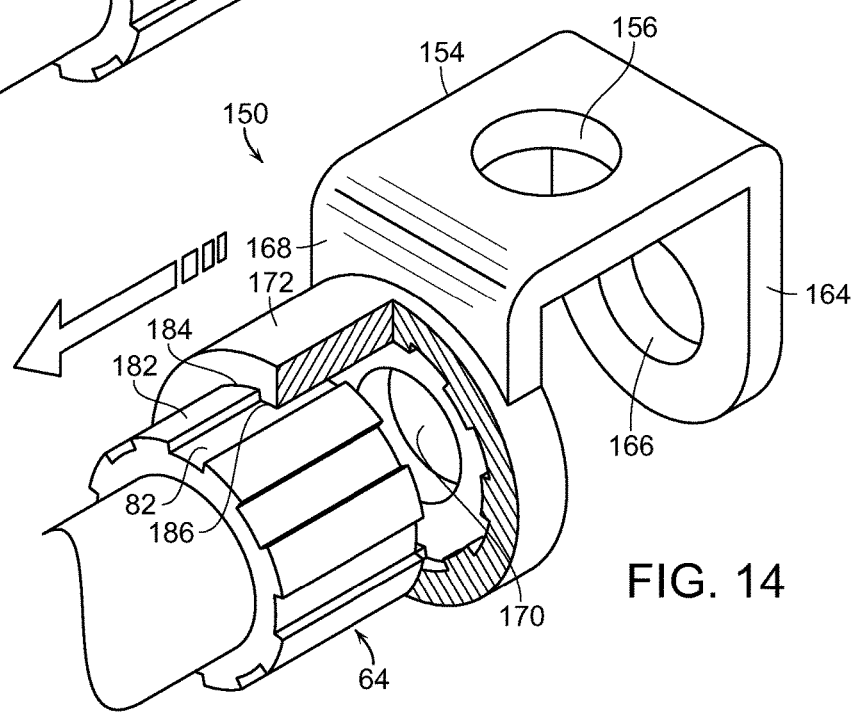
FIG. 14 is a perspective and partially sectioned view illustrating the apparatus being slidably attached to the outlet of the pass-through fitting, in accordance with the present invention.

With reference to FIGS. 13 and 14, the inner surface of the socket 172 may also be configured so as to have a mirror or mating configuration to an outer surface of the nut 62 so as to be slidingly attachable thereto, while preventing rotation of the socket 172, and thus apparatus 150, relative to the fitting 34. For example, as illustrated in FIGS. 13 and 14, the nut 62 of the fitting 34 includes a series of grooves 82 which are spaced apart from one another, forming elevated sections 182. Grooves 184 are formed on the inner surface of the socket 172 which are sized and configured so as to receive the elevated sections 182, as illustrated in FIGS. 13 and 14 as the apparatus 150 of the present invention is moved and slid into connection with the nut 62. The resulting extensions or tongues 186 of the inner surface of the socket 172 are inserted within the grooves 82 of the nut 62, as illustrated in FIG. 14. This forms a sliding, frictional fit between the nut 62 and the apparatus 150 of the present invention. Moreover, it will prevent the apparatus 150, and liquid level sensor 152, from rotating with respect to the fitting 34.

It will be understood that the apparatus 150 is typically disposed with respect to the fitting 34 as shown in FIG. 1 so that the liquid level sensor 152 is upright. However, the liquid level sensor 152 could be positioned at any desired angle, so long as it is positioned as desired and maintained in such position with respect to the liquid pass-through fitting 34 and more particularly the liquid outlet tube 64. It will also be appreciated that the outer configuration of the fitting 34 and the corresponding mating inner surface configuration could vary from that illustrated in FIGS. 13 and 14, yet still achieve the objectives of the present invention of removably attaching the apparatus 150 to the fitting 34 and maintaining the position of a liquid level sensor 152 with respect to the heater 10 and liquid outlet tube 64. An aperture through the side wall and corresponding screw or bolt could also be incorporated into the embodiment illustrated in FIGS. 13 and 14 so as to securely hold the apparatus 150 to the fitting 34.

It will be appreciated by those skilled in the art that the incorporation of the socket 172 into the apparatus 150 forces one to install the apparatus 150 of the present invention onto the pass-through fitting 34 of the liquid and not farther upstream from the heater 10. If the apparatus 150 of the present invention is positioned along the liquid outlet tube 64 at a distance from the fitting 34, the apparatus 150 and the liquid level sensor 152 will not remain upright as it would freely rotate around the liquid tubing 64. Forcing the user to attach the socket 172 to the fitting 34 will maintain the proper and desired position and orientation of the liquid level sensor 152 to the liquid outlet tube 64. Moreover, it will position the liquid level sensor 152 adjacent to the liquid outlet tube 64 where the liquid tube 64 immediately attaches to the liquid pass-through fitting 34, ensuring correct readings as to whether liquid is present and/or passing through the tube 64, and thus the heater 10.

Although several embodiments have been described in detail for purposes of illustration, various modifications may be made without departing from the scope and spirit of the invention. Accordingly, the invention is not to be limited, except as by the appended claims.

What is claimed is:

1. An in-line heater for high purity fluids, comprising:
   a heating vessel, defined at least in part by a wall, through which high purity fluid to be heated flows;
   a port comprising a first aperture formed through the wall of the vessel, a second aperture of greater diameter than the first aperture extending into the wall generally concentric with the first aperture and a ring or groove formed in the wall between the first and second apertures so as to face an open end of the second aperture; and
   a fitting attached to the port and having a body defining a pass-through passageway, a peripheral outer surface of the body having threads engaging threads of an inner surface of the second aperture of the port and a face of a free end of the body of the fitting having a groove or a ring which mates with the corresponding ring or groove of the port to form a liquid seal between the end of the fitting and the wall of the vessel and a liquid seal between the end of the fitting and the peripheral outer surface of the body to prevent high purity fluid from contacting the threads of the port and fitting.

2. The heater of claim 1, wherein a ring extends from the end of the fitting body and mates with a groove of the port.

3. The heater of claim 1, wherein the port comprises a groove formed in the wall in spaced relation and concentric to the first aperture.

4. The heater of claim 3, wherein a ring extends from the end of the fitting body that substantially mates with the groove.

5. The heater of claim 1, wherein the fitting includes a nut attachable to a second end of the fitting body for securing a tube to the fitting.

6. The heater of claim 5, wherein the nut and second end of the fitting body are threadedly connected to one another.

7. The heater of claim 5, wherein an outer surface of the second end of the fitting body and an inner surface of the nut are configured to cooperatively engage the tube therebetween.

8. The heater of claim 5, wherein the nut includes a compression connector that compresses against the tube as the nut is attached to the second end of the fitting body.

9. The heater of claim 1, wherein the fitting includes a stop extending from the body intermediate the ends thereof that contacts an exterior surface of the wall to prevent further insertion of the fitting into the port of the wall.

10. The heater of claim 1, wherein the fitting includes a stop extending from the body intermediate the ends thereof that contacts an exterior surface of the wall to prevent further insertion of the fitting into the port of the wall.

11. The heater of claim 1, wherein a portion of the outer surface of the fitting intermediate the ends thereof is multi-faceted to provide an engageable surface with an attaching or removing tool.

12. The heater of claim 1, wherein a portion of the outer surface of the fitting intermediate the ends thereof is multi-faceted to provide an engageable surface for an attaching or removing tool.

13. An in-line heater for high purity fluids, comprising:
   a heating vessel, defined at least in part by a wall, through which high purity fluid to be heated flows;
   a port formed in the wall of the vessel comprising a first aperture extending through the wall, a groove formed in the wall in spaced and concentric relation to the first aperture and a second aperture having a greater diameter than the first aperture and the groove and extending from an exterior surface of the wall so as to be generally concentric with the groove and the first aperture;
   a fitting attached to the port and having a body defining a pass-through passageway, the body having an outer surface having threads which threadedly attach to internal threads of the second aperture of the port, a free end of the body of the fitting having a ring protruding therefrom which mates with the groove of the port to form a liquid seal between the end of the fitting and the wall of the vessel, and the end of the fitting and the outer surface of the body to prevent high purity fluid from contacting the threads of the body and port; and
   a nut attachable to a second end of the fitting body for securing a tube to the fitting.

14. The heater of claim 13, wherein the nut and second end of the fitting body are threadedly connected to one another.

15. The heater of claim 13, wherein an outer surface of the second end of the fitting body and an inner surface of the nut are configured to cooperatively engage the tube therebetween.

16. The heater of claim 13, wherein the nut includes a compression connector that compresses against the tube as the nut is attached to the second end of the fitting body.

* * * * *